United States Patent [19]

Mount, II et al.

[11] Patent Number: 4,774,573
[45] Date of Patent: Sep. 27, 1988

[54] METHOD AND APPARATUS FOR GENERATING A VIDEO DISPLAY FROM SIGNALS PRODUCED BY BOREHOLE SCANNING

[75] Inventors: Houston B. Mount, II, Tulsa; Steven A. Morris, Sand Springs, both of Okla.

[73] Assignee: Amoco Corporation, Chicago, Ill.

[21] Appl. No.: 37,294

[22] Filed: Apr. 10, 1987

[51] Int. Cl.⁴ ............................................... H04N 5/31
[52] U.S. Cl. .................................... 358/112; 358/100; 364/422; 73/152; 367/69; 367/71; 367/113; 367/115
[58] Field of Search ......................... 358/100, 112, 93; 367/113, 86, 69, 71, 115; 324/323, 338; 364/422; 340/853, 854, 855; 73/607, 151, 152; 175/48, 49, 50

[56] References Cited

U.S. PATENT DOCUMENTS

| | | | |
|---|---|---|---|
| 3,668,619 | 6/1972 | Dennis | 367/69 |
| 4,012,712 | 3/1977 | Nelligan | 73/152 X |
| 4,310,887 | 1/1982 | Suau | 364/422 |
| 4,346,593 | 8/1982 | Howells et al. | 73/152 |
| 4,463,378 | 7/1984 | Rambow | 358/112 |
| 4,740,930 | 4/1988 | Broding | 367/69 |

Primary Examiner—Howard W. Britton
Assistant Examiner—Victor R. Kostak

[57] ABSTRACT

Apparatus for creating a video display from information generated by acoustically scanning a reflecting boundary circumferential of a borehole. A downhole tool generates a first signal each time a rotating transducer therein passes through magnetic north. Acoustic pulses emitted from the transducer are radially transmitted toward a borehole reflecting boundary. At least a portion of each pulse is reflected back to the transducer where the same is detected and converted to an electrical pulse representative of the reflected acoustic pulse. The peak of each electrical pulse is detected and the value digitized. A series of different addresses is associated with each digital value from a single 360° borehole scan and the same are accumulated in a RAM with each digital value being stored therein at its associated address. A central processing unit selects a block of video memory locations in a video memory responsive to the magnetic north signal. The data stored in the RAM is transferred directly to the video memory by applying the RAM addresses, as the data is read out thereof, to the video memory thus transferring the data to the selected block of video memory locations. An address generator is provided for rapidly reading data from the video memory for generating a video display therefrom.

45 Claims, 8 Drawing Sheets

METHOD AND APPARATUS FOR GENERATING A VIDEO DISPLAY FROM SIGNALS PRODUCED BY BOREHOLE SCANNING

BACKGROUND OF THE INVENTION

1. Field of the Invention

The present invention relates to methods and apparatus for creating video display signals suitable for generating a video display of a borehole and more particularly to such methods and apparatus in which the display signals are derived from information generated by acoustically scanning a reflecting boundary circumferential of the borehole.

2. Setting of the Invention

One type of device for logging a borehole to determine the characteristics of the surrounding formation is sometimes referred to as a borehole televiewer. Such a device includes a motor received a housing which is receivable in a wellbore. A transducer assembly is received in the housing and may be rotated by the motor. As the housing is raised or lowered in a wellbore, power is supplied to the motor via a cable which connects the housing to a generator at the surface of the wellbore. Periodic transducer firing pulses are applied to the rotating transducer assembly. Such firing pulses cause the transducer assembly to emit an acoustic pulse along a radial borehole axis for each firing pulse applied thereto. When periodic firing pulses are applied to the transducer assembly, the borehole is helically scanned with acoustic pulses. A portion of the energy from each acoustic pulse is reflected by a reflecting boundary adjacent the borehole along a radial axis back toward the transducer assembly which detects the reflected energy. The reflecting boundary may be the radially inner surface of the casing, the casing-borehole interface or an interface between formations in the ground surrounding the wellbore. If logging is conducted in an uncased well, the borehole wall comprises one reflecting boundary.

An electrical pulse is generated which is related to the energy of the reflected acoustic pulse detected by the transducer. Information regarding the relative times at which the firing pulses and the electrical pulses occur and the magnitude of the electrical pulses is transmitted to the surface on a cable. This information can be used to generate a video display of the borehole wall which the tool has scanned.

One method and apparatus for creating such a video display is disclosed in U.S. Pat. No. 3,728,672 to Dennis et al. In Dennis et al., the electrical pulses generated by reflected acoustic pulses in the borehole are used to modulate the z-axis of a video monitor while a horizontal or x-axis sweep is initiated for each full revolution of the transducer. Thus, a new sweep of the video monitor is initiated for each 360° scan of the borehole wall and an image relating to the characteristics of the borehole wall appears on the monitor.

U.S. Pat. No. 4,463,378 to Rambow discloses a borehole televiewer display which creates a video display of a borehole in a somewhat different manner than that disclosed in the Dennis et al., patent. In Rambow, the peak amplitude of each electrical signal is converted to a digital number which is supplied to a conventional computer that is programmed to arrange the digitized amplitude signals in the same order in which they are received. The signals corresponding to one cycle or scan of the tool are arranged to provide one horizontal sweep of a television monitor and each signal is assigned a shade of gray depending upon its amplitude. The computer also stores in its memory the number of cycles corresponding to the number of lines for a complete video display, normally 512 lines. The computer continually replaces the oldest cycle with a new cycle in its memory and retains only the 512 lines.

In another prior art configuration, the peak amplitude of each electrical signal is converted to a digital number, as in Rambow, and is supplied to a computer programmed to arrange the digitized amplitude signals in a single row which corresponds to the data generated by a 360° borehole scan. Each time a row is accumulated, it is transferred to a commercially available video frame buffer which stores a significant number of rows for a complete video display.

It should be noted that the borehole signal data used to create the video display is generated more slowly than the speed which is required to generate a video display. Thus, a storage buffer for the data is necessary and in the past has comprised a conventional computer memory or a commercially available frame buffer as described above.

The above-described prior art techniques for generating a video display of a borehole reflecting boundary suffer from several disadvantages. First, when a conventional computer is used to store a complete video frame, normally 512 lines, a large computer having a substantial memory is required.

A much smaller computer may be used in conjunction with a commercially available frame buffer because, in such a configuration, the computer need only have the capacity to accumulate a single row at a time which is then transferred to the frame buffer. This configuration also suffers disadvantages. When data is transferred from the computer to the frame buffer, it must be done through an input/output port. The port includes a first data bus, such typically having 8 lines to accommodate a single byte of data, which connects the computer to the port and a second data bus which connects the port to the frame buffer. A first control line is connected between the port and the computer and a second control line is connected between the port and the frame buffer. The computer must signal the port to indicate the presence of data for transfer to the frame buffer. Similarly, the frame buffer must signal the port to indicate when it is ready to receive data. Such handshake and status checking routines slow the rate at which data may be transferred.

Another disadvantage associated with the frame buffer is the necessity for generating a unique address for each byte of data transferred to the frame buffer. The video display is divided into a plurality of discrete units or pixels, each of which assumes a preselected shade of gray depending upon the value of an associated data byte. This typically requires a 17-bit address which identifies each pixel by a row and column position. For a computer which generates addresses in 8 bit numbers, three separate operations are necessary in order to produce a single 17-bit address. Since this operation must be repeated for each byte of data transferred to the frame buffer, the rate of operation of the system is further slowed. Slow data transfer places an upper limit on the frequency at which firing pulses can be applied to the transducer assembly and thus limits the rate at which a wellbore may be logged. When the digitized amplitude values are recorded on magnetic tape, the slow transfer of data to the frame buffer places an unacceptably low limit on the rate at which recorded data may be played back to generate a reflecting boundary image on a video monitor.

In addition to the above-described drawbacks, commercially available frame buffers are typically expensive, complex pieces of equipment which are both bulky and heavy. It is desirable to utilize compact and lightweight equipment since the same must be transported to and from remote well sites for logging operations. The above-described prior art systems necessitate the use of either a large computer or a large frame buffer.

There exists a need for a method and apparatus for generating a video display from signals produced by borehole scanning which overcomes the disadvantages associated with prior art methods and apparatus.

There exists a need for such an apparatus which is more compact and lightweight and less expensive than prior art apparatus.

There exists a need for such a method and apparatus in which a block of data may be rapidly transferred from signal data storage means, in which the data is accumulated, to a video memory means, from which data may be read for generating a video display.

There exists a need for such a method and apparatus in which a video display is generated from a borehole televiewer signal utilizing a relatively small computer without the loss of speed inherent in a commercially available frame buffer.

SUMMARY OF THE INVENTION

The instant invention comprises a method and apparatus for creating video display signals from information generated by acoustically scanning a reflecting boundary circumferential of a borehole. Such scanning generates a first signal representative of the geographic orientation of a transducer acoustically scanning such a reflecting boundary and a second series of signals representative of acoustic reflections from the reflecting boundary. The method of the invention includes the steps of generating a series of different addresses, each of which is associated with a different second signal. Each second signal is stored in a data storage memory location determined by the address associated therewith, thus forming a set of video precursor data. A block of memory locations is selected in a video memory responsive to the first signal. The block includes a plurality of locations sufficient for storing a set of video precursor data. Thereafter, a set of video precursor data is transferred to the thus-selected block of the video memory. Additional sets of precursor data may be transferred in the same manner.

The apparatus of the invention includes means for performing the steps of the method of the invention.

DETAILED DESCRIPTION OF THE PREFERRED EMBODIMENT OF THE INVENTION

The instant embodiment of the apparatus of the invention which is disclosed herein is used to create a video display from information generated by acoustically scanning a reflecting boundary circumferential of a borehole. A tool for acoustic scanning includes means for generating a first signal representative of the geographic orientation of a transducer acoustically scanning the reflecting boundary and means for generating a series of second signals representative of acoustic reflections from the reflecting boundary. The apparatus of the invention includes an address generating means for providing each second signal with a different address. Each second signal is storable in signal data storage means at a location determined by the address associated with each second signal, thus forming a set of video precursor data. A plurality of sets of precursor data is storable in video memory means. Video memory selection means responds to the first signal by selecting a block of video memory locations in the video memory means which comprises a plurality of locations sufficient for storing a set of video precursor data. Transferring means is providing for transferring a set of video precursor data to a thus selected block of the video memory means.

In one aspect of the invention, the apparatus comprises means for displaying a resulting plurality of sets of video precursor data transferred to the video memory means as an image of the reflecting boundary.

The apparatus of the instant invention provides a means for rapidly and efficiently transferring blocks of data generated by a borehole televiewer, such blocks typically comprising one or more 360° borehole scans, from a memory in which the data accumulates as it is generated to a video memory from which the data may be read for generating a video image of a reflecting boundary in the borehole.

Figure 2:
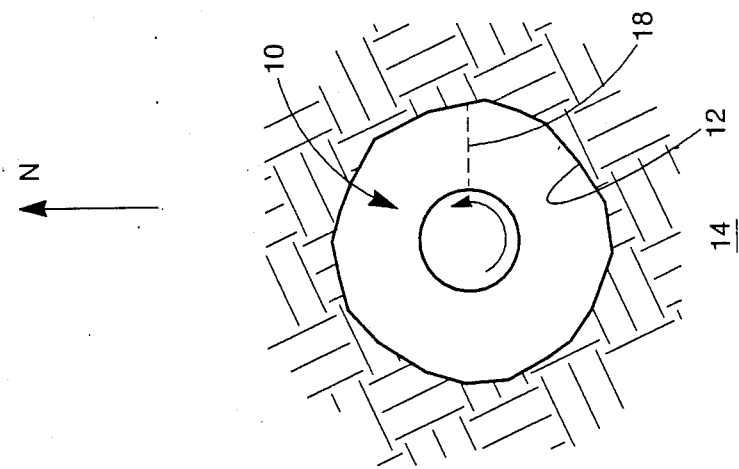
FIG. 2 is a view taken along 2—2 in FIG. 1.
Figure 1:
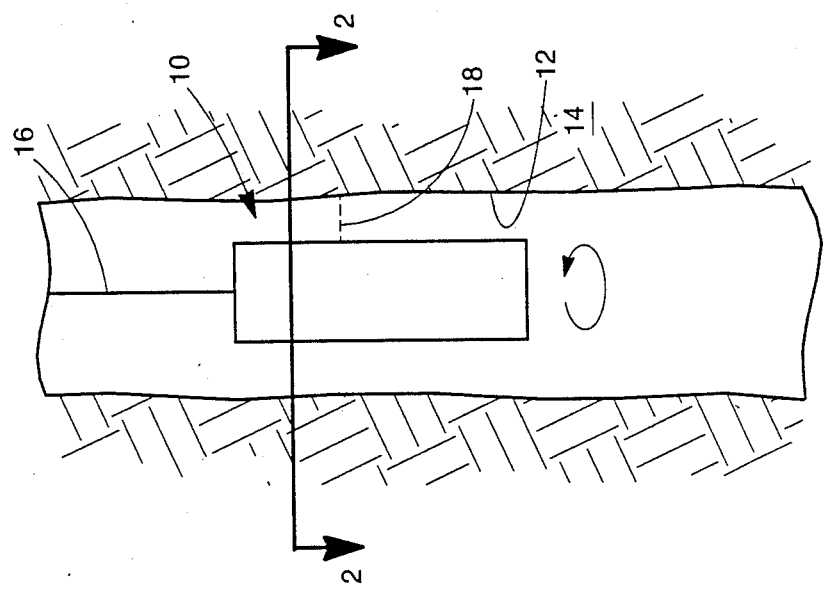
FIG. 1 is a sectional view of a wellbore having an acoustic scanning apparatus lowered therein.

Considering now the structure of the preferred embodiment of the apparatus of the instant invention, attention is directed to FIGS. 1 and 2 wherein indicated generally at 10 is a tool for acoustically scanning a borehole. Tool 10 is shown received in a wellbore 12 which has been drilled in formation 14. The tool is suspended by a cable 16 which extends from the tool to the surface and which includes a wireline for supporting the weight of tool 10 and electrical cables for providing power to electronic components in tool 10 and for providing communication of electrical signals between the tool and the surface, as will hereinafter be more fully explained.

Tool 10 includes therein a transducer (not visible), such being also referred to herein along with associated components as means for generating a series of second signals representative of acoustic reflections from the reflecting boundary. The transducer is mounted on a rotatable shaft. A periodic firing signal comprising a plurality of firing pulses may be applied to the transducer for generating an acoustic energy pulse responsive to each firing pulse. The transducer is positioned so that the acoustic pulse travels along a radial axis 18 toward the wellbore wall. At least a portion of the acoustic pulse is reflected back toward the transducer which detects the same and converts the reflected acoustic energy to an electrical pulse. Thus, a signal 20 (in FIG. 4) appears across the transducer which comprises a plurality of periodic firing pulses, like pulses 22, 24, 26, etc., and a plurality of electrical pulses, like pulses 28, 30, 32, etc. The electrical pulses are also referred to herein as a series of second signals representative of acoustic reflections from the reflecting boundary and as digital reflectance signals.

In the usual logging operation, tool 10 is caused to move upwardly in the borehole by raising cable 16 while the periodic firing signal is applied to the rotating transducer. It can thus be seen that the borehole is helically scanned with acoustic pulses. The electrical pulses generated by the transducer responsive to the reflected acoustic pulses contain information relating to the characteristics of the borehole wall. As will hereinafter be more fully explained, these electrical pulses are digitized and thereafter processed for generating a video display of the reflecting boundary.

A second signal 34 (in FIG. 4) is generated by a magnetometer (not visible), received in tool 10. The magnetometer is also referred to herein as means for generating a first signal representative of the geographic orientation of the transducer. Signal 34 includes a pulse, like north pulses 36, 38, which is generated each time the rotating transducer assumes a predetermined rotational position relative to magnetic north, such being indicated by the vertical arrow in FIG. 2. In other words, for each rotation of the transducer a north pulse, like north pulses 36, 38, is generated. Each north pulse is provided to an electrical conductor for transmission to the surface in cable 16.

Figure 3:
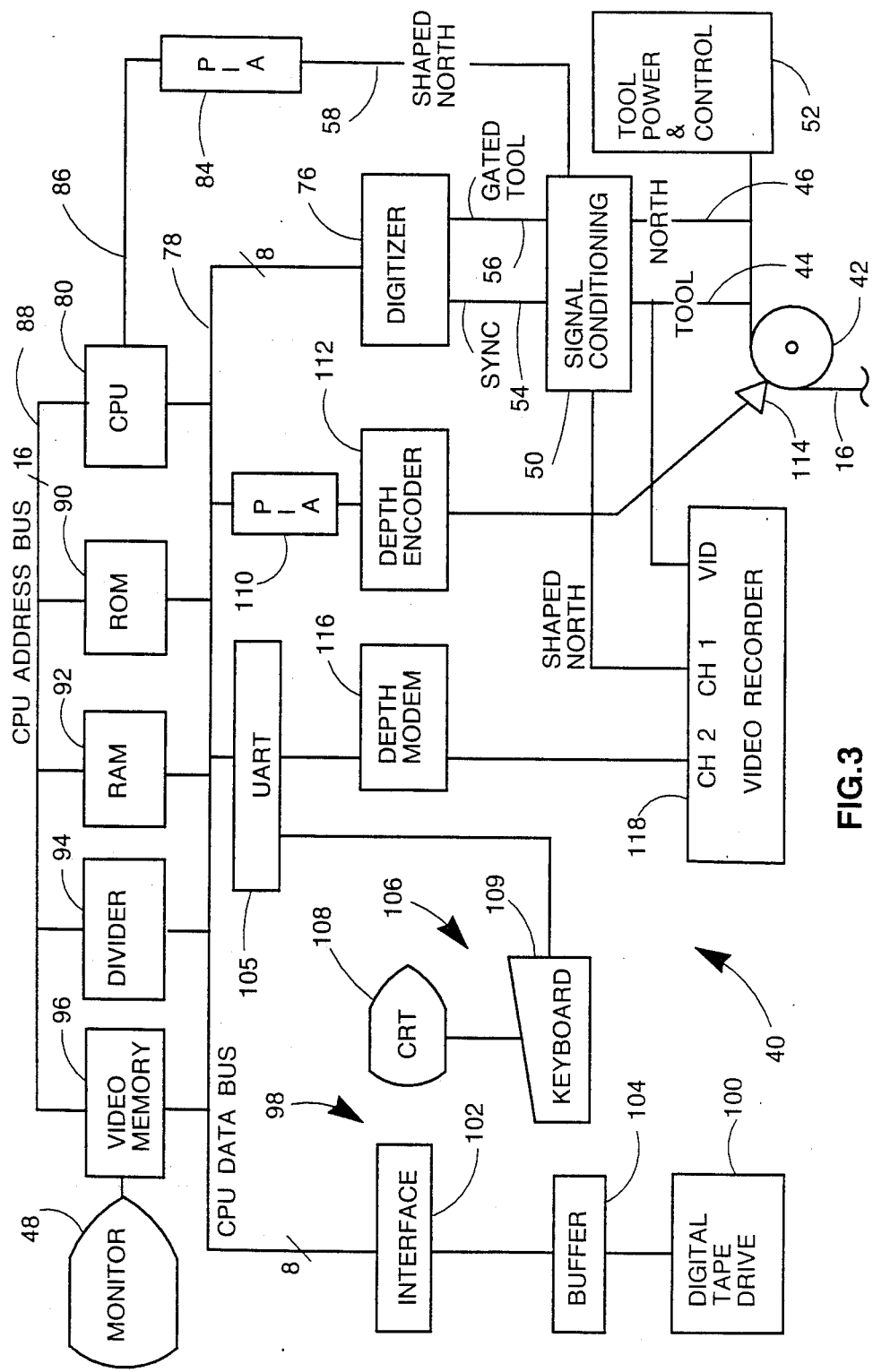
FIG. 3 is a schematic diagram of apparatus constructed in accordance with the instant invention.

Turning now to FIG. 3, indicated generally at 40 is a system located at the surface of the wellbore for processing signals 20, 34 (in FIG. 4) for generating a video display on a monitor. Cable 16 is received over a pulley 42 at the surface of wellbore 12. Tool 10 is lowered in the bore by unrolling cable 16 from a spool (not shown) and is raised in the bore by rolling the cable onto the spool. Signals 20, 34 are both used to generate the display and are applied to system 40 via lines 44, 46, respectively, which are taken from the conductors in cable 16 that are connected to tool 10. Generally speaking, system 40 detects the peak of each electrical signal, like signals 28, 30, 32 in the tool signal, converts the same into a digital amplitude, and stores the thus generated digital amplitude in a memory. The stored signals are read from the memory and applied to a monitor 48 to display a 360° view of the reflecting boundary in the borehole.

At the outset, a general description of the structure and operation of system 40 will be made. As mentioned, signals 20, 34 applied to system 40 via lines 44, 46 which in turn are connected to a commercially available signal conditioning circuit 50 which comprises a portion of system 40. The remainder of the electrical conductors in cable 16 are provided to a tool power and control circuit 52, such providing power to the motor in tool 10 which rotates the transducer.

Signal conditioning circuit 50 processes the signals appearing on lines 44, 46 and generates three output signals which appear on lines 54, 56, 58. A sync pulse signal 60 (in FIG. 46) appears on line 54 when system 40 is in operative condition and comprises a plurality of sync pulses, like pulses 62, 64, 66. Each of the sync pulses is generated responsive to a firing pulse, like firing pulses 22, 24, 26 in tool signal 20. Thus, each sync pulse corresponds to the occurrence of a firing pulse.

A gated tool signal 68 (in FIG. 4) appears on line 56 and consists of tool signal 20 with the firing pulses, like firing pulses 22, 24, 26 gated out of the signal. Gated tool signal 68 therefore comprises the electrical pulses, like electrical pulses 28, 30, 32, which are generated by reflected acoustic energy striking the transducer in tool 10.

Figure 4:
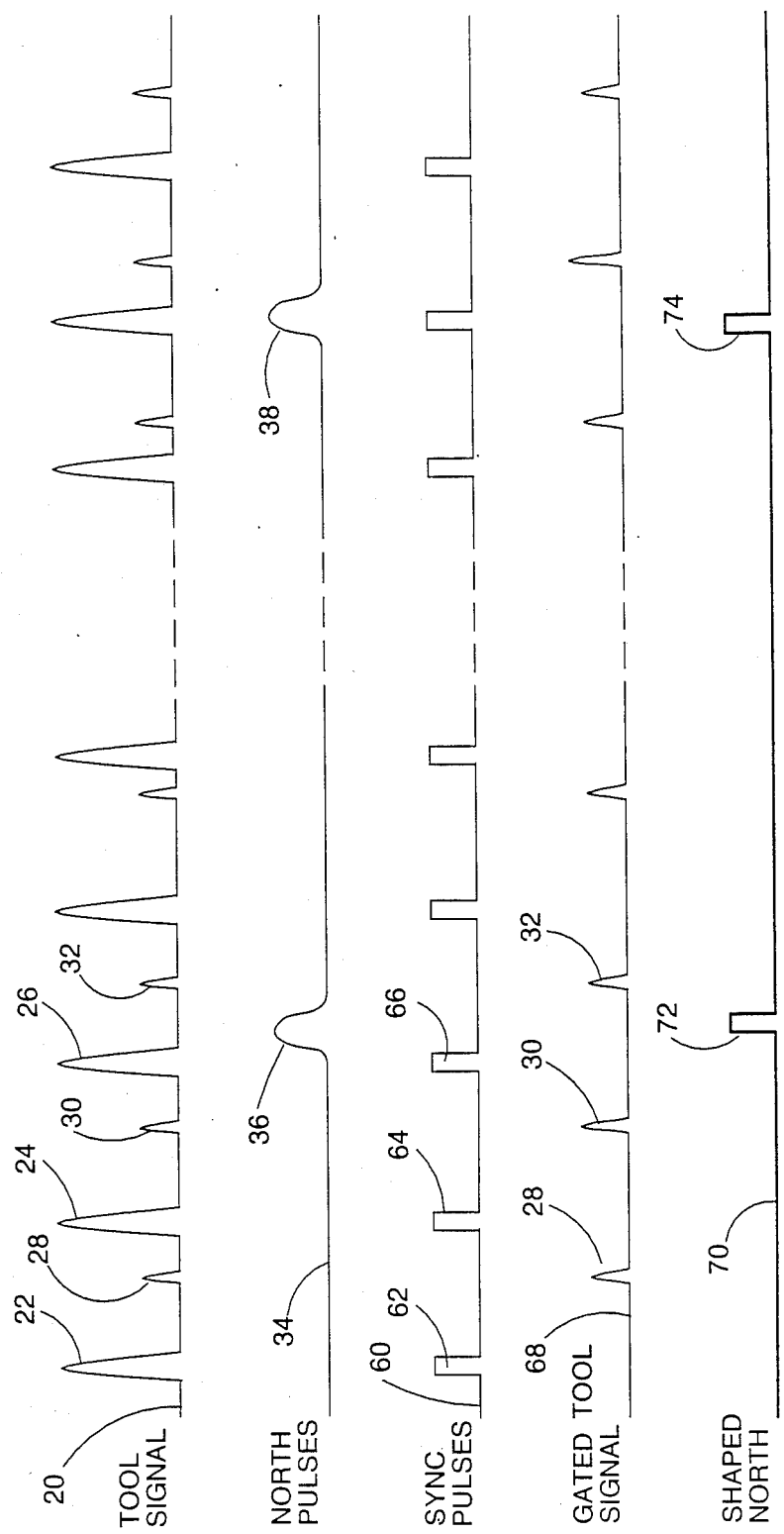
FIG. 4 shows signals generated by the apparatus of FIGS. 1 and 3.

A shaped north signal 70 appears on line 58 and comprises shaped north pulses, like shaped north pulses 72, 74, which correspond in time to the north pulses in signal 34 generated by the magnetometer in tool 10. The shaped north pulses in signal 70 are squared off as shown in FIG. 4 to provide a more readily identifiable pulse for other components in system 40 as will be hereinafter explained.

Sync pulse signal 60 and gated tool signal 68 are each provided to a digitizer 76 on lines 54, 56, respectively. Digitizer 76 generates two sets of data for each electrical pulse in gated tool signal 68. First, the digitizer circuit detects the peak of each electrical pulse and converts the same to an 8-bit digital value. Secondly, digitizer 76 measures the time between each sync pulse, like sync pulse 62, and the following electrical pulse, like pulse 28, such time being represented by an 8-bit digital value. The time so measured is the time that it takes the acoustic energy pulse to travel from the transducer to the reflecting boundary and back to the transducer. Preferably, the digitizer is constructed in accordance with the disclosure attached hereto as Appendix I and incorporated herein by reference. As will be explained in more detail, the digital peak and time values are sequentially applied to an eight line data bus 78 which is connected to, among other things, the output of digitizer 76 and to the output of a central processing unit (CPU) 80. In the instant embodiment of the invention, CPU 80 comprises a commercially available 6502 microprocessor.

In FIG. 3, the slash in the line designating bus 78 and the adjacent numeral eight indicate a bus made up of eight separate conductors. Such a bus is used to transmit 8-bit bytes of data. In the drawings, a numeral other than eight appearing adjacent a slash through a line designates a bus having the number of separate conductors indicated by the adjacent numeral. A line connected to such a bus comprises a branch of the bus and includes the same number of conductors as the bus to which it is connected.

The time and peak values so generated are both referred to herein as a series of second signals representative of acoustic reflections from the reflecting boundary and as digital reflectance signals.

A commercially available interfacing device, such comprising a parallel interface adapter (PIA) 84, receives the shaped north pulses (signal 70) on line 58 and is connected to a CPU control terminal via a control line 86. As will be hereinafter described in connection with the description of the programming and operation of CPU 80, the CPU is signaled via line 86 each time a north pulse occurs. The CPU formats the digital peak and time values for video display in a row responsive to the occurrence of each north pulse.

The CPU includes a line address bus 88 which is connected to the address input bus on, among other components, a read only memory (ROM) 90, a random access memory (RAM) 92, and a hardware divider 94. In a similar manner, the CPU data bus is connected to the data input/output busses of ROM 90, RAM 92 and divider 94. RAM 92 is referred to herein as signal data storage means. Memories 90, 92 are commercially available memories with the program instructions for CPU 80 being stored in ROM 90 and with RAM 92 being used for temporary storage of data manipulated by the CPU. Likewise, divider 94 is a commercially available 8-bit divider, in the instant embodiment of the invention comprising an RCA 1855 arithmetic chip.

Figure 7:
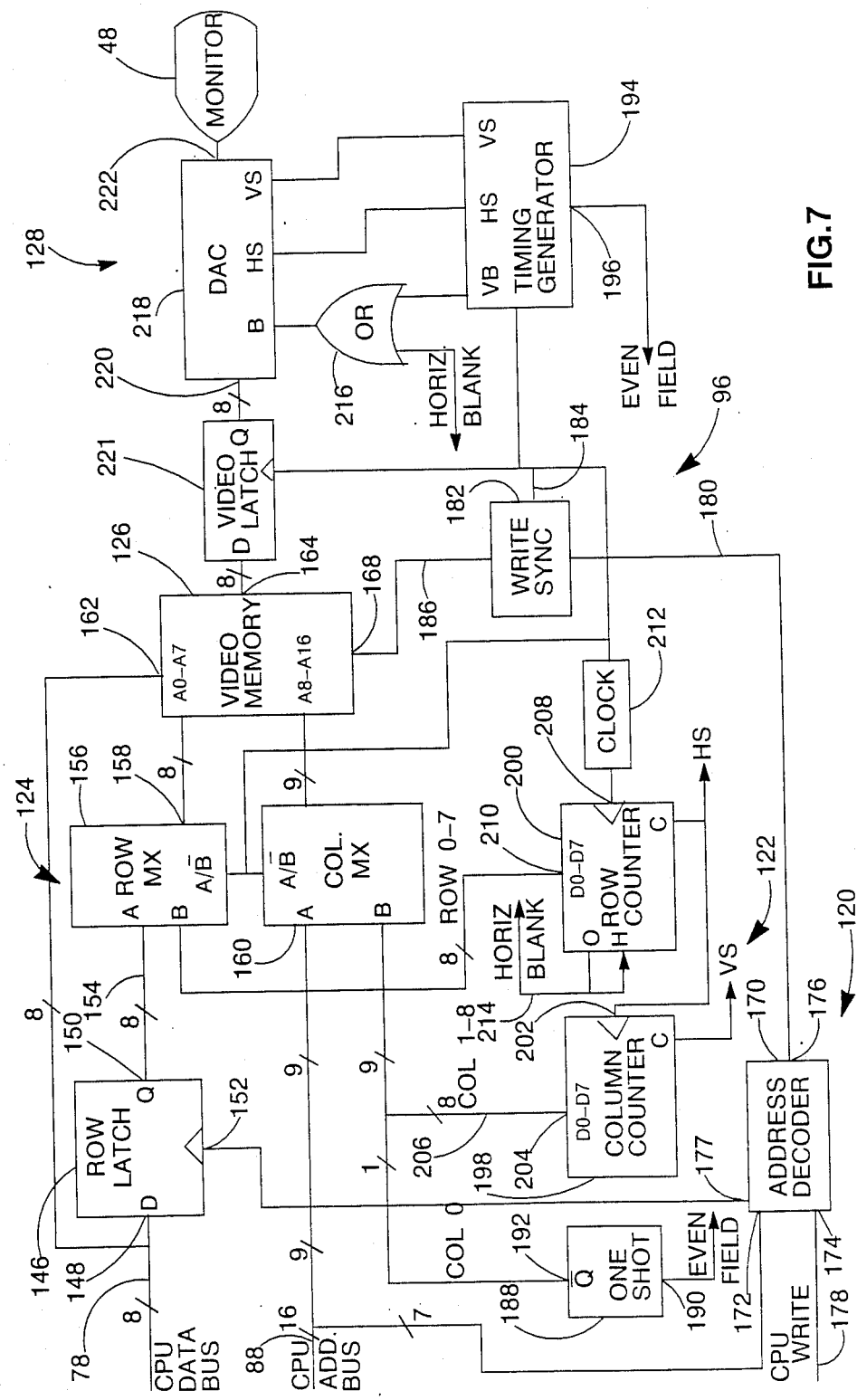
FIG. 7 is a schematic diagram of the video memory circuit of FIG. 3.

Address bus 88 and data bus 78 are also connected to a video memory circuit 96, which is shown in detail in FIG. 7. The output of video memory circuit 96 is applied to monitor 48 upon which an image of the borehole reflecting boundary is formed when system 40 is in operation.

Data bus 78 is further connected to recording and playing back means, indicated generally at 98, which includes a digital tape recorder 100. Also included in means 98 is a commercially available computer interface 102 and a data buffer 104. Generally speaking, each time CPU 80 retrieves peak and time data from digitizer 76, the same is transmitted via interface 102 to buffer 104 which gradually fills with data. Data from the buffer is periodically applied in a relatively rapid burst to the digital tape in tape drive 100, thus storing the same for later playback and analysis as will later be described in more detail. Buffer 104 minimizes the number of starts and stops tape drive 100 must take as data is recorded.

Data bus 78 is also connected to a commercially available universal asynchronous receiver transmitter (UART) 105. UART 105 provides an interface between CPU 80 and a commercially available operator's console 106, such including a cathode ray tube monitor 108. Console 106 includes a keyboard 109 for generating commands for directing CPU 80, thus controlling the overall operation of system 40.

Data bus 78 is also connected to a commercially available parallel interface adopter 110 which is substantially identical in structure and operation to PIA 84. PIA 110 provides an interface between CPU 80 and a commercially available depth encoder 112. The depth encoder is in turn connected to a commercially available shaft encoder 114 such generating pulses responsive to rotation of pulley 42. Depth encoder 112 generates a digital code representative of the depth of the tool and supplies the same via PIA 110 to bus 78. The CPU can provide such depth data to interface 102 and buffer 104 for recording by digital tape drive 100, to video memory 96 for display in conjunction with the wellbore image display on monitor 48, or to a depth modem 116 via UART 105 for recording the depth data on a commercially available video recorder 118. Video recorder 118 functions in system 40 as a analog recorder and receives tool signal 20 at the video input thereof, shaped north signal 70 on one channel, and the digital depth data via modem 116 on another channel.

As will become more fully apparent, the tool signal stored on tape driven by video recorder 118 may be applied to signal conditioning circuit 50 just as real time signals from tool 10 are applied thereto to enable review of the stored analog signal. The shaped north pulses recorded on one channel of the video recorder are applied to PIA 84 just as the real time shaped north pulses are applied thereto. The digital depth data stored on the other channel of the video recorder is applied via depth modem 116 and UART 105 to data bus 78 for display on monitor 48 along with the wellbore image formed by the tool signal played back on recorder 118.

Additionally, the digital tape in digital tape drive 100 may be played back. The played back digital data is formatted by the CPU in the same manner as the data from digitizer 76 and is provided to video memory circuit 96 for display on monitor 48 in the same manner as the data provided in real time; however, the speed of the digital tape may be varied, thus enabling speeding up viewing of the borehole image to a rate several times greater than real time viewing.

It is to be appreciated that all data bus, address bus, and control line connections between CPU 80 and various other components of system 40 are not shown in FIG. 3 to enhance clarity. A person having ordinary skill in the art could readily provide such bus and control line connections.

Figure 5:
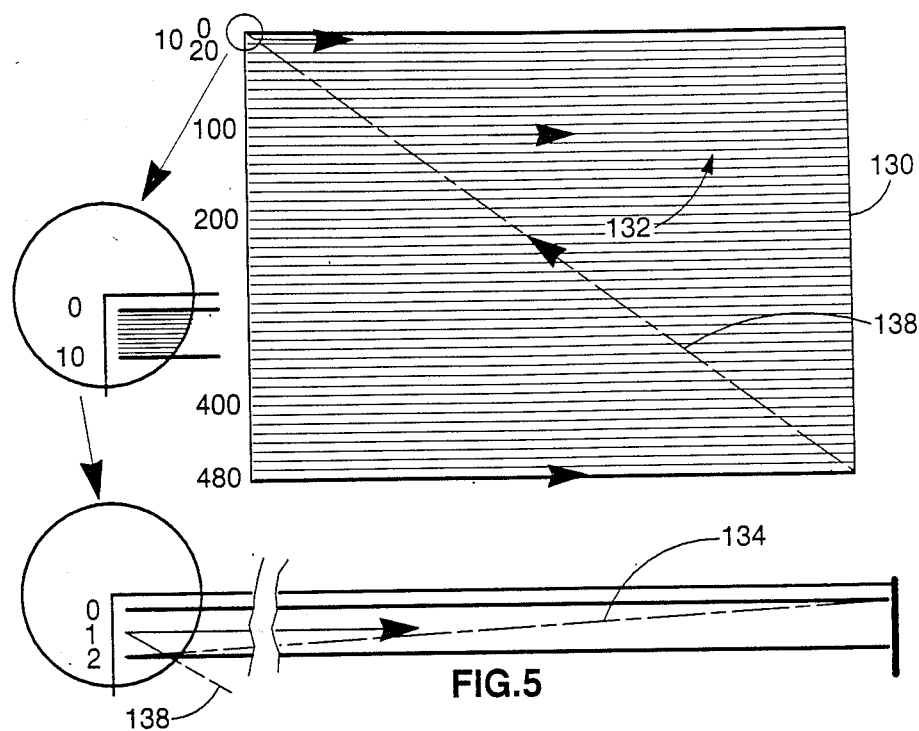
FIG. 5 is a schematic illustration of the sequence of scanning on an NTSC video monitor.

Prior to providing a general description of the operation of system 40, consideration will first be given to definition of terms. Attention is directed to FIG. 5 wherein a video monitor screen 130 includes a plurality of scan lines 132 thereon. Monitor screen 130 illustrates the NTSC video standard in which 480 intensity modulated horizontal scan lines sweep the face of the screen. The odd scan lines are interlaced with the even lines, with each line being designated 0-480 to the left of screen 130. The even lines sweep the face of the screen on a first pass or field and the odd lines sweep the screen on a second pass or field. As can be seen, the first scan line (scan line 0) sweeps the screen from left to right. During retrace, indicated by dot-dash line 134, horizontal blanking occurs, thereby preventing image generation on screen 130 during the retrace. After retrace, the next even scan line (scan line 2) appears on the screen. After the last even scan line (scan line 480), vertical retrace occurs which is designated by dot-dash line 138. Vertical blanking occurs during vertical retrace to prevent an image of the retrace from appearing on screen 130. After vertical retrace, the odd scan lines, beginning with scan line 1, are written onto the screen.

Figure 6:
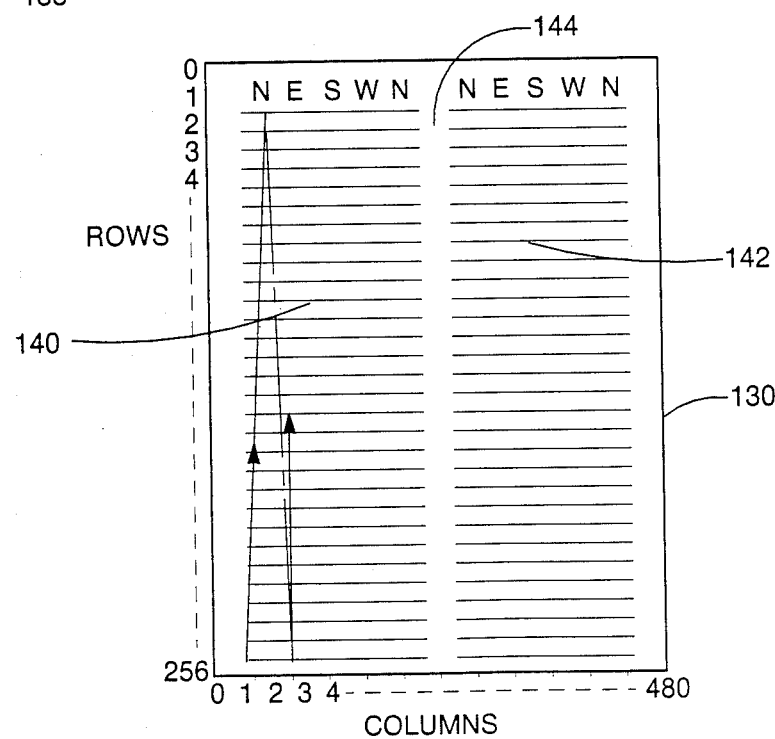
FIG. 6 is a view of the monitor of FIG. 7 turned on its left side displaying information relating to the wellbore.

Considering now FIG. 6, screen 130 is turned on its left side relative to the view of FIG. 5. Included on screen 130 in FIG. 6 are a pair of borehole images with image 140 being derived from the peak data and image 142 being derived from the time data. Each image represents a 360° view of the borehole wall with magnetic north comprising both the left and right image boundaries. Letters designating directions appear across the top of each image. A depth display field 144 appears between images 140, 142 and provides a space on screen 130 for display of the borehole depth at which the images were developed.

A single unit of the display appearing on screen 130 is referred to herein as a pixel. Each scan line comprises a column which is divided into 256 segments or pixels. Thus, there are 256×480=122,880 total pixels on the screen arranged in 256 rows, each of which contains 480 pixels. A single pixel may be located by identifying the same with a row number (0–256) and a column number (0–480).

Each row on a screen 130 corresponds to a single 360° scan (for each image) of tool 10. As will later be described in more detail, a row may have fewer pixels than the number of electrical pulses developed from each acoustic reflection in the scan because the digital values for several horizontally adjacent pulses are averaged into one pixel. Each column on screen 130 corresponds to electrical pulses developed from vertically adjacent acoustic reflections for a number of 360° tool scans. A column on display 130 may have fewer pixels than the number of corresponding tool scans from which the column was derived due to averaging of digital values for vertically adjacent tool pulses.

The intensity of each pixel corresponds to its data value. For peak display, a 256-bit gray scale is provided with a dark screen corresponding to a digital value of 0 and a bright screen corresponding to a digital value of 255.

A similar gray scale is adopted for the pixels in the time image with a bright pixel designating a short travel time (an thus a reflecting boundary close to the transducer) and a dark pixel designating a longer travel time.

Describing now only generally the overall operation of system 40, the program stored in ROM 90 causes CPU 80 to retrieve the peak and time data for each electrical pulse which is presented at the output of digitizer 76. Such data, comprising two 8-bit bytes for one pulse, is sent by the CPU, via interface 102, to buffer 104, where data blocks are transferred in bursts to digital tape drive 100.

Next, each of the two bytes is stored in memory location in RAM 92 which is part of a group of memory locations forming a summing buffer, with peak data being stored in a peak summing buffer and time data being stored in a time summing buffer in the order in which each dara byte is received in its associated buffer.

CPU 80 is programmed to add the peak data derived from a selected number of vertically adjacent scans. The summed data is thereafter divided by hardware divider 94 responsive to CPU control, thus producing an average data value representative of several vertical rows. In a similar fashion, a selected number of adjacent peak values from a single borehole scan are added together and divided (by divider 94) by the number of adjacent data values added to create an average of several horizontally adjacent pulse peak values. When such averaging is complete, the averaged data comprises 480 bytes and is received in a buffer in RAM 92 containing 480 memory locations. Each byte corresponds to a digital pixel value in different columns in a single row which can be displayed on monitor 48. Each data byte which may be used to generate a pixel on the monitor may be referred to as a pixel byte. Each memory location in which the pixel bytes are stored in RAM 92 is selected by a different address applied to bus 88 by the CPU.

When such a row is accumulated in RAM 92, a row storage location in video memory circuit 96 is selected when CPU 80 provides a row number on data bus 78 to circuit 96, thus selecting a block of video memory locations in the video memory circuit. Thereafter, CPU 80 outputs the row in RAM 92 on data bus 78 to the selected memory locations in video memory circuit 96 by applying the address for each pixel byte of averaged peak data to address bus 88. The CPU simultaneously applies the same address to video memory circuit 96 since bus 88 is also connected thereto. Each byte in the row so transferred is thus stored in a row location in video memory circuit 96 which is selected by the row number applied by the CPU to bus 78 (before transfer of the data bytes) and in a column location on that particular row selected by the address applied simultaneously by CPU 88 to RAM 92 and video memory circuit 96.

After a row is transferred from RAM 92 to video memory circuit 96, CPU 80 creates, in response to a north pulse, a second row of averaged data in RAM 92 in the same manner as described. When the second row is accumulated, it is transferred in the same manner to the next row location in the video memory circuit. The next row location is selected by a value applied to data bus 78 by the CPU. The second row stored in RAM 92 is stored in the same location as the preceding row and thus the same addresses are applied by the CPU to bus 88 to transfer the same from RAM 92 to video memory circuit 96; however, the second row is not transferred into the same location of video memory circuit 96 as the first row because the CPU has selected the next row location by designating the same on data bus 78 prior to transferring the second row. In a similar fashion, additional rows are transferred to the video memory circuit while the rows stored therein are being read out to create an image display on monitor 48.

It is to be appreciated that the time data generated and stored in the time summing buffer in RAM 92 may be averaged and displayed in the same fashion as described for the peak data. The instant embodiment of the invention provides for presentation of either a time image display or a peak image display on monitor 48 or, alternatively, a split screen in which the time image appears on one side and the peak image on the other as shown in FIG. 6. Turning now to FIG. 7, consideration will be given to the structure and operation of video memory circuit 96.

Video memory circuit 96, such being also referred to herein as video memory means for storing a plurality of sets of precursor data, comprises several subcircuits, including a CPU interface indicated generally at 120, an address generator indicated generally at 122, a multiplexer circuit indicated generally at 124, a video random access memory 126 and a video output and timing circuit indicated generally at 128.

Describing generally the overall operation of video memory circuit 96, multiplexer circuit 124 applies an address generated by CPU 80 and provided on data bus 78 and address bus 88 to address input terminals $A_0$–$A_{16}$ of memory 126 for one-half of each clock cycle. During the other half of each clock cycle, multiplexer 124 applies an address generated by address generator 122 to memory address terminals $A_0$–$A_{16}$. During each cycle in which the address is applied to memory 126 by CPU 80, a byte from the summing buffer in RAM 92, such representing a single video display pixel, may be read into memory 126. During each other half cycle, a single data byte is read from memory 126 and is provided to circuit 128 where it is converted to an analog value and applied to monitor 48 for the duration of a clock cycle, thereby generating a reflecting boundary image on the monitor.

Considering now in more detail the structure of circuit 96, included therein is a commercially available latch 146. The latch includes an input bus 148, an output bus 150, and a latch terminal 152. Latch 146 operates in the usual manner in that digital data appearing on input bus 148 is stored in the latch and appears on the output bus thereof responsive to a pulse on terminal 152. Input bus 148 is directly connected to CPU data bus 78. Output bus 150 is connected by a bus 154 to an input bus A of a row multiplexer 156. Row multiplexer 156 includes input busses A, B and an output bus 158. When a high signal level is applied to a control terminal A/$\overline{B}$ on multiplexer 156, input A is connected to output bus 158. Conversely, when a low signal level appears at terminal A/$\overline{B}$, input bus B is connected to output bus 158.

A column multiplexer 160 is substantially identical to row multiplexer 156 and operates in the same fashion; however, multiplexer 160 includes nine line input busses and nine line output busses. Input bus A of multiplexer 160 is connected to the nine lines of CPU address bus 88 upon which appear the 9 least significant bits of address information.

The output busses of multiplexers 156, 160 are connected to address input terminals $A_0$–$A_{16}$ of RAM 126. RAM 126 comprises a commercially available random access memory having an input data bus 162, an output data bus 164, and a write terminal 168 in addition to the previously-mentioned address terminals. When a 17-bit address is applied to the address terminals of RAM 126, an 8-bit data byte stored in the RAM at the selected address appears on output data port 164. When a high signal level is applied to write terminal 168, data appearing on input bus 162 is stored in RAM 126 at the address appearing on the address terminals when the signal is applied to terminal 168. Thus, data can be written into and read from the RAM.

CPU interface 120 includes therein a commercially available address decoder 170. Decoder 170 includes an input bus 172, an input terminal 174, and output terminals 176, 177. The 7 lines from CPU address bus 88, which carry the 7 most significant bits of address information on the bus, are connected to input bus 172. A control line 178, such being denominated "CPU WRITE" in FIG. 7, connects a control terminal (not shown) on CPU 80 with input terminal 174 of the address decoder. The address decoder is programmed in the usual manner to generate output control signals on terminals 176, 177 responsive to preselected signals appearing on input terminal 174 and input bus 172. When a signal is applied to output terminal 177, data on CPU data bus 78 is latched into latch 146 and is thus presented at output bus 150 of the latch.

Output terminal 176 on the address decoder is connected by a line 180 to a commercially available write sync circuit 182. The write sync circuit receives the signal generated by the address decoder on line 180 as well as a clock signal on line 184 and generates an output signal on line 186 which causes data presented at data input bus 162 on RAM 126 to be stored in the RAM at the address location appearing on terminals $A_0$–$A_{16}$. Attention is now directed to address generator 122 which is also referred to herein as means for addressing a plurality of video memory locations for reading video precursor data therefrom. Included therein is a commercially available one shot multivibrator 188. One shot 188 includes an input terminal 190 and an output terminal 192. The one shot operates in the usual manner in that the rising edge of a pulse applied to terminal 190 causes output terminal 192 to fall to a low level for a preselected period of time after which the signal level on terminal 192 again rises to a high level until another pulse is applied to terminal 190.

Input terminal 190 is connected by a line identified by the designation "even field" to a commercially available video timing generator 194. Timing generator 194 generates the timing signals which are necessary to create the NTSC standard video signal applied to monitor 48. Such signals include horizontal blanking, which occurs during each horizontal retrace; vertical blanking, which occurs each vertical retrace; horizontal sync, a pulse beginning at the start of each horizontal trace; and vertical sync, a pulse which synchronizes the beginning of both the odd and even fields. In addition, an even field pulse is produced on terminal 196 of timing generator 194 which is supplied to input terminal 190 of one shot 188. An even field pulse is produced at the beginning of each even field, i.e., at the start of each scan line 0.

Output terminal 192 of one shot 188 is connected to one terminal in input bus B of column multiplexer 160.

Also included in address generator 122 is a commercially available column counter 198 and a commercially available row counter 200.

Column counter 198 includes an input terminal 202 which is connected to the horizontal sync output of timing generator 194. Also included in counter 198 is a count output bus 204 upon which appears the current count generated by the counter. It can be seen that for each horizontal sync pulse the count on bus 204, such being indicated by an 8-bit binary number, is incremented by 1. The count so generated is applied oy bus 206 to eight terminals of input bus 8 of column multiplexer 160.

Counter 200 includes an input terminal 208 and an output bus 210. Like counter 198, counter 200 generates a count for each pulse applied to input terminal 208 and displays the same as an 8-bit binary number, on bus 210, that is incremented by 1 for each pulse applied to terminal 208. The output of an oscillator or clock 212 is applied to terminal 208, thus incrementing the row counter once each clock cycle.

The row counter further includes a clear terminal, a hold terminal, and an overflow terminal, such being designated by the letters C, H, and O, respectively. A pulse applied to the clear terminal clears the count on bus 210 to zero. A pulse applied to the hold terminal holds the count on bus 210 regardless of additional pulses appearing on input terminal 208. Row counter 200 generates an overflow pulse that appears on the overflow terminal when the count exceeds the maximum count, i.e., all high signal levels appearing on output bus 210 which corresponds to decimal 255. When such occurs, the overflow pulse appears on the hold terminal, thus holding the maximum count on bus 210.

The overflow signal so generated serves as a horizontal blanking signal, such being identified on line 214 as "HORIZ BLANK," which is applied to one input of a commercially available OR gate 216. The other input of OR gate 216 is provided by timing generator 194 and consists of the vertical blanking pulses necessary to form the NTSC video signal. The output of the OR gate is applied to a blanking input terminal, designated B, on a commercially available digital to analog converter (DAC) 218.

DAC 218 includes a digital input bus 220 and an analog output terminal 222. Binary digital numbers, ranging from 0 to decimal 255, may be applied to input bus 220. DAC 218 converts the digital number appearing on its input bus to one of 256 analog values which is applied to output terminal 222. In addition, DAC 218 receives vertical sync, horizontal sync, and vertical blanking signals from timing generator 194 with a horizontal blanking signal being received from the overflow output terminal of counter 200 via gate 216. Timing generator 194 inserts the appropriate horizontal and vertical sync pulses at the beginning of each scan line and each field, respectively, as well as horizontal and vertical blanking pulses to generate a composite NTSC video signal on terminal 222 with that portion of the signal comprising scan lines being generated by the data applied to bus 220.

A latch 221 has an input bus connected to the output of RAM 126 and an output bus connected to input bus 220 of DAC 218. Latch 221 is substantially identical in structure and operation to latch 146.

Figure 8:
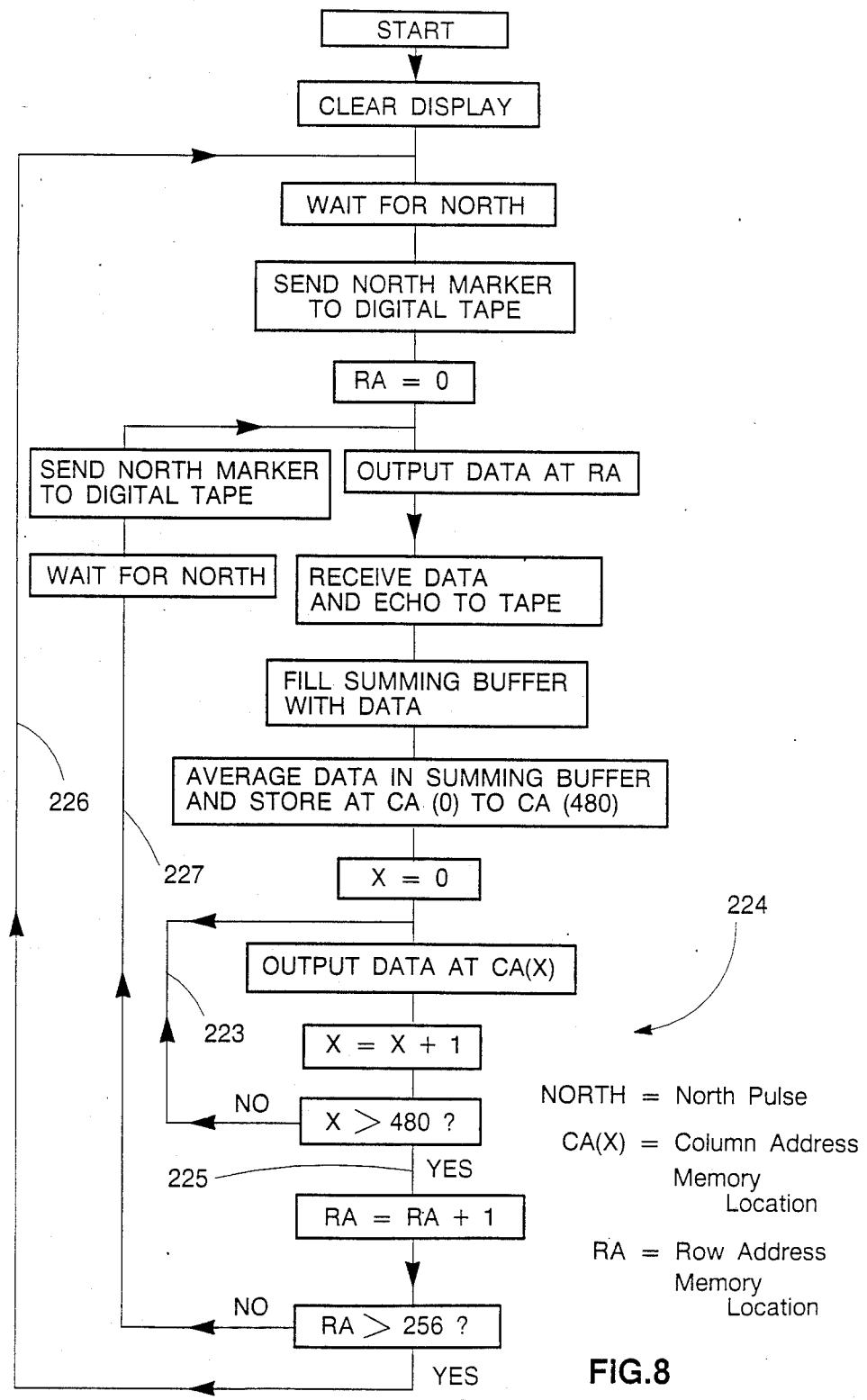
FIG. 8 is a flow chart showing a program for the central processing unit in FIG. 3.

Consideration will now be given to the operation of system 40 with the use of the flow chart shown in FIG. 8, which indicates the manner in which the CPU is programmed. It is to be appreciated that the program instructions illustrated in the flow chart of FIG. 8 are stored in binary form in ROM 90. A person having ordinary skill in the art could use the flow chart of FIG. 8 to write such a program which operates in the following described manner.

Consideration will be given to the manner in which peak data supplied by digitizer 76 is used to produce a video image on monitor 48. It is to be appreciated that the time data may be used to generate an image in the same fashion but, for the purpose of the example, consideration will be given only to a peak image display. After the program starts, the display is cleared by writing the same digital value into all memory locations in RAM 126. CPU 80 then waits for the next north pulse generated by tool 10, the presence of such a pulse being communicated to the CPU via line 86. In response to a north pulse, CPU 80 retrieves a preselected 8-bit digital marker from ROM 90 and transmits the same via the data bus to digital tape drive 100. The 8-bit digital marker is selected to be a value different from digital peak and time data recorded by digital tape drive 100. Upon playback of tape, CPU 80 is programmed to respond to the digital marker in the same manner as the north pulse. After the digital marker is transmitted to the tape, a zero value is stored at a memory location denominated RA (for row address) in RAM 92. Thereafter, the CPU provides the address for RA on address bus 88 which causes the current value of RA, in this case such being equal to zero, to appear on the data bus. In FIG. 7, the address for RA is also detected by address decoder 170 which is programmed to cause the signal level on terminal 177 to go to a high level, thereby latching the value at RA in latch 146.

After the RA value is so latched, the CPU retrieves peak and time data from digitizer 76 on the data bus and transmits the same to tape drive 100 for recording. Thereafter, the data is provided to the summing buffer in RAM 92. The CPU continues to retrieve data from the digitizer, echo the data to the digital tape, and store the same in the summing buffer until data generated by at least one 360° scan is received in the summing buffer. If the data is to be averaged, several scans, in the order of 2 or 3, may be retrieved and placed in the summing buffer for averaging into a single row of pixel bytes. After the data is in the summing buffer, horizontal and vertical summing occurs under control of the CPU. After such summing is performed, each piece of the summed data is divided by divider 94 responsive to CPU commands, in order to produce the average value of the peak data which has been summed into a single pixel. For example, if three horizontally adjacent peak values are added together and two vertically adjacent peak values are added together, a total of 6 peak values are used to define a single pixel for video display. The total so generated is divided by 6 to arrive at the average value.

When a complete row of 480 averaged peak values, each of which may be used to generate a pixel on the screen of monitor 48, is accumulated in RAM 92, the row is stored in memory locations denominated CA(0) through CA(480) (CA standing for column address). Thereafter, variable X is set at zero and the CPU outputs the data at CA(0) by addressing the same in RAM 92 via address bus 88. The 7 most significant bits ff the address appearing on the address bus are applied to address decoder 170 in FIG. 7, thus signalling the video memory circuit of the presence of a byte of pixel data on data bus 78. The address of CA(X), in combination with the CPU write signal on line 178, which signifies the presence of data on data bus 78, causes a high signal level to appear on terminal 176. When clock 212 next cycles to a high level, the write sync circuit 182 causes a high level to appear on line 186, thus writing the pixel byte on the data bus into memory 126.

When the clock cycle is high, input ports A are selected on both multiplexers 156, 160. Thus, the 8 most significant bits of the address applied to RAM 126 is the value at RA which, as will be recalled, is stored in latch 146. The 9 least significant bits of the address appearing on the address bus comprise the 9 least significant bits of the address of CA(X) in RAM 92.

It can therefore be seen that the first pixel byte in the row stored in RAM 92 is written into RAM 126 at a memory location addressed by a row address value, such being stored in latch 146, and a column address value, such appearing on the 9 address bus lines applied to multiplexer 160. After the first pixel byte is transferred from RAM 92 to RAM 126 in the video memory circuit, X is incremented by 1 as shown in the flow chart of FIG. 8. X is then checked to see whether or not it exceeds 480, the maximum number of pixels allowable in row, i.e., the total number of columns in the video display. As will be recalled from FIG. 6, the pixels are arranged in 256 rows, each of which contains 480 columns. If X is not greater than the maximum allowed value, branch 233 is taken and the pixel byte at the current column address, in the instant case 1 (since the column address was incremented by 1), is output in the same fashion as the pixel byte at CA(0). Thus, the subroutine indicated generally at 224 in the flow chart cycles until the entire row of pixel bytes in RAM 92 is transferred to RAM 126. During subroutine 224, the row address applied to RAM 126 is the value stored in latch 146 while the column address increments by 1 in accordance with routine 224. When X is greater than 480, i.e., when each pixel byte in the row has been transferred from RAM 90 to RAM 126, branch 225 is taken and the row address is incremented by 1 and compared to the maximum allowable number of rows, i.e., 256. If the current value of RA is not greater than 256, branch 227 is taken, the CPU waits for the next north pulse, and sends a digital north marker to the tape when such occurs. Thereafter, the program causes the CPU to output the new data at RA which in the example under consideration equals the number 1 and designates the pixel bytes in the first row. As in the output of row zero, the CPU retrieves data from the digitizer and echos the same to the digital tape. Next, the data is added in the summing buffers, divided by divider 94 and stored at column addresses CA(0) to CA(480). Thereafter, the entire row one is output in accordance with subroutine 224 in the same manner is described for row zero. The value of RA is incremented by 1, and if the current value of RA is not greater than 256,branch 227 is taken and the next row is output. The program continues in this manner until 256 rows, which equal an entire screen, is output to RAM 126 in the video memory circuit. After an entire screen has been so transferred, RA is greater than 256 and branch 226 is taken. After the north pulse, the digital north marker is sent the tape as before, RA is set to zero and row-by-row transfer of averaged data in the summing buffer proceeds as before.

Figure 9:
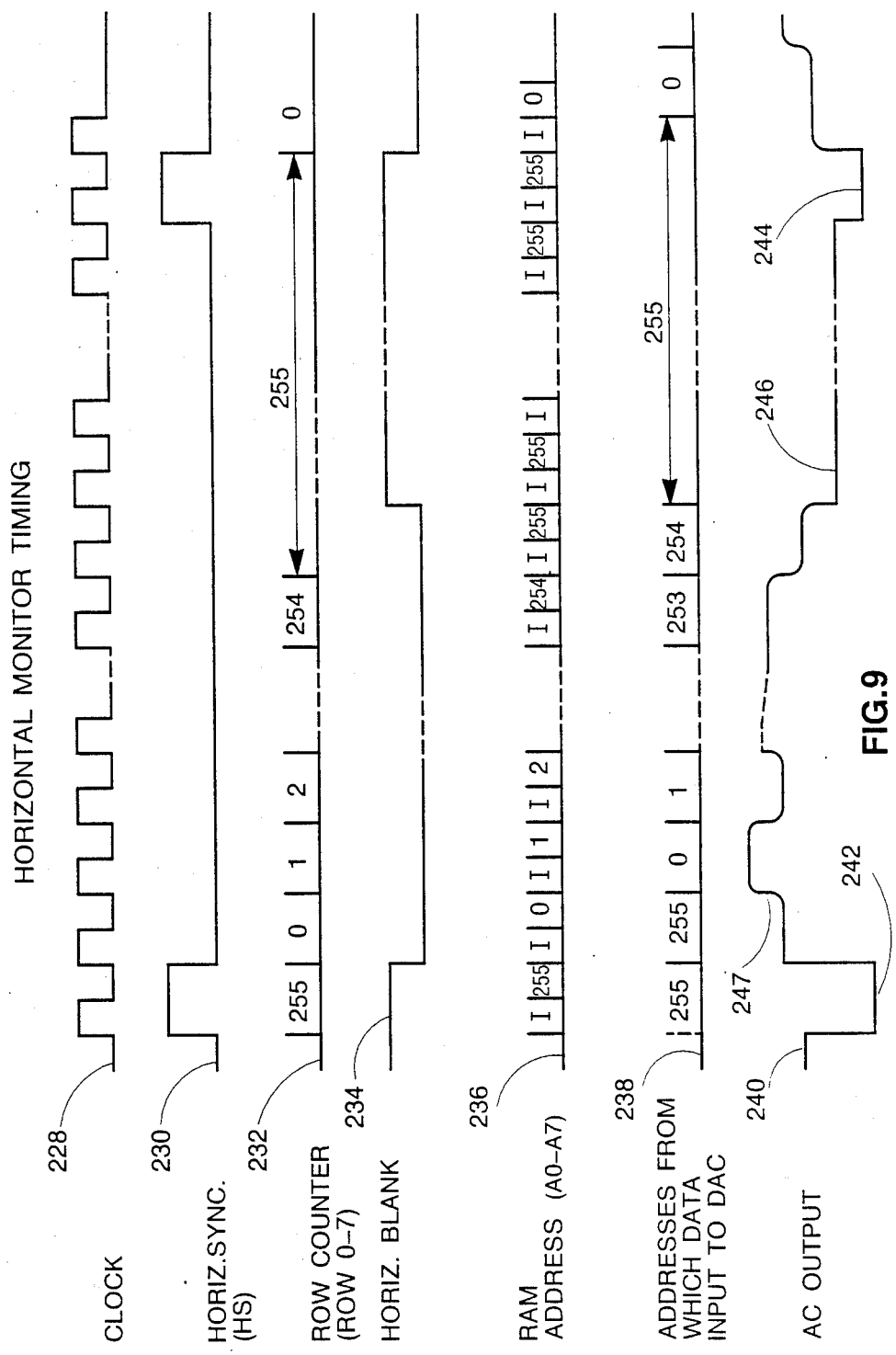
FIG. 9 shows signals produced by the video memory circuit which relate to horizontal monitor timing.
Figure 10:
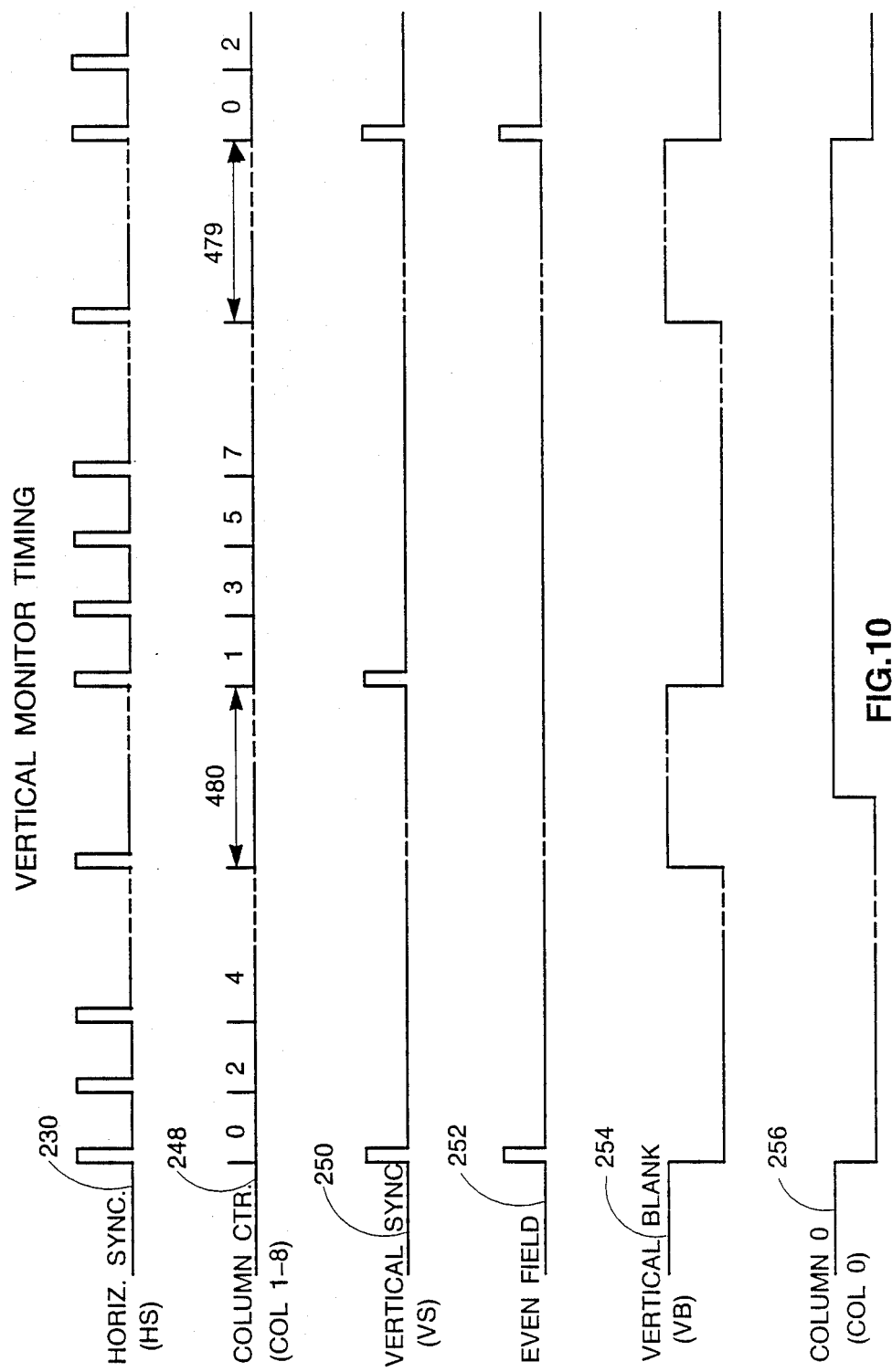
FIG. 10 shows signals produced by the video memory circuit which relate to the vertical monitor timing.

More detailed consideration will now be given to the operation of video memory circuit 96 in FIG. 7 in view of the timing signals in FIGS. 9 and 10. FIG. 9 illustrates the signals associated with the generation and timing of horizontal scan lines, while FIG. 10 illustrates the signals associated with the generation and timing of the odd and even fields. Clock 212 in FIG. 7 generates a clock signal 228 in FIG. 9. This signal is applied to terminal 208 of counter 200, to terminals A/$\overline{\text{B}}$ of multiplexers 156, 160, to write sync circuit 182, and to video latch 221. An NTSC horizontal sync signal 230 is generated by timing generator 194 and is applied to DAC 218 on the horizontal sync (HS) terminal to generate the NTSC format video signal which is applied to monitor 48. Horizontal sync signal 230 is also applied to the clear terminal of counter 200 and to input terminal 202 of counter 198. A horizontal sync pulse as shown in signal 230 is generated at the start of each monitor scan.

A counter output timing diagram 232 for row counter 200 in FIG. 7 is shown in FIG. 9. Each of the numbers on diagram 232 is the decimal value of the 8-bit binary output of the counter. As can be seen, each time clock signal 228 goes from a low to a high level, the counter output is incremented by 1 until an overflow condition is attained, i.e., until the first low to high clock transition after 255. When the overflow terminal goes from a low to a high level, the high level is applied to the hold terminal which holds the 255 count on the output of counter 200 until the falling edge of the next horizontal sync pulse which clears counter 200 to zero. After the counter is cleared, the overflow condition is removed and the counter again begins upward counting.

A horizontal blanking signal 234 is created by counter 200 on the overflow terminal output. When the counter is in an overflow condition, signal 234 is at a high level.

A timing diagram 236 for the address terminals $A_0$–$A_7$ of RAM 126 indicates generally the condition of output bus 158 of row multiplexer 156. When the clock signal is at a high level, the binary value in latch 146 applied to input bus A of multiplexer 156 appears on output bus 158. For each pixel byte row transferred from RAM 92 to RAM 126 in the video memory circuit, a different row number is stored in latch 146. As will later become more apparent, data on data bus 78 may be input to RAM 126 during this input phase (designated I in diagram 236) of the clock cycle.

When clock signal 228 falls to a low level, the value appearing on input bus B of multiplexer 156 appears on output bus 158 of the multiplexer. This value is the count appearing on output bus 210 of counter 200.

A timing diagram 238 indicates the addresses from which data is applied to input bus 220 of DAC 218 and the relative time at which such data is applied. Because of the relative times at which data is written into RAM 126 and latched into video latch 221, there is a delay of one clock cycle between the generation of a row address on counter 200 and the time at which the particular pixel addressed in RAM 126 is applied to input bus 220 of DAC 218.

A video signal 240 includes horizontal sync pulses 242, 244 which are generated by horizontal sync signal 230 and a horizontal blanking pulse 246 which is generated by signal 234. An analog video signal 247, which is developed between horizontal sync pulse 242 and horizontal blanking pulse 246, includes a different analog value for each clock cycle, each of which defines a single pixel in the 256 pixel column appearing between sync pulse 242 and blanking pulse 246.

It can thus be seen that CPU 80 generates a series of different column addresses with each address so generated being associated with a different pixel byte in the row stored in RAM 92. The CPU generates a row address on data bus 78 and stores the same in latch 146, thus selecting a block of video memory locations in RAM 126. As CPU 80 addresses each pixel byte in the row for reading the same from RAM 92, the pixel byte address is also applied via address bus 88 and multiplexer 160 to RAM 126. When each pixel byte value is applied to input bus 162 of RAM 126, the row address selected by CPU 80 appears on terminals $A_0$–$A_7$ of RAM 126 and the column address, such comprising the 9 least significant bits of the address in RAM 92 at which the pixel in question was stored, appears on address terminals $A_8$–$A_{16}$ of RAM 126. Thus, each pixel from RAM 92 is stored in RAM 126 at a position related to a unique row and column address. Data is thus written into RAM 126 row by row and read therefrom column by column for creating the video signal.

Turning now to FIG. 10, illustrated therein are a number of signals and a counting diagram which related to the vertical timing for display of the reflecting boundary image on monitor 48. Horizontal sync signal 230, which is also shown in FIG. 9, is shown in FIG. 10 on a time scale which permits inclusion of a number of horizontal sync pulses. As will be recalled, horizontal sync signal 230 is generated by timing generator 194 and is applied to the clear terminal of counter 200 and the input terminal of column counter 198 (as well as to the VS terminal of DAC 218).

A timing diagram 248 includes decimal numbers which indicate the value of the binary count appearing on output bus 204 of counter 198 and the relative time at which such counts appear.

A vertical sync signal 250 is generated by timing generator 194 and is supplied to the VS terminal of DAC 218. Signal 250 includes a plurality of pulses, each of which is generated at the start of each video field. As will be recalled, an even video field, such having scan lines including columns 0, 2, 4, etc., is alternatively interlaced with an odd video field, such having scan lines including columns 1, 3, 5, etc.

An even field signal 252 comprises a pulse each time an even field scan begins. Signal 252 is produced by timing generator 194.

A vertical blanking signal 254 is generated by timing generator 194 and is provided to DAC 218 via OR gate 216. The vertical blanking signal goes to a high level, thus blanking the video signal during vertical retrace, i.e., after the last scan line in a field.

A column 0 signal 256 appears on output terminal 192 of one shot 188. Even field signal 252 appears on input terminal 190 of one shot 188. Thus, each time an even field pulse goes from a low to a high level, the output of one shot 188 drops to a low level for a preselected period of time. The time period at which the one shot remains at a low level is adjusted so that the transition back to the high level occurs during a vertical blanking pulse in signal 254.

It can be seen that as each column is read from RAM 126 and provided to DAC 218, a constant column number generated by the outputs of one shot 188 and counter 198 is presented to address terminals $A_8-A_{16}$ on RAM 126 via multiplexer 160 each time the clock signal is at a low level. Column 0 signal 256 defines the least significant bit of the address to RAM 126 via multiplexer 160. During even fields, all even addresses are presented to RAM 126, thus causing all even columns to be written therefrom. During odd fields, signal 256 remains at a high level, thus reading all odd columns from RAM 126.

System 40 produces a first cycle in which data may be input to RAM 126 at an address made up of a CPU-generated row address stored in latch 146 and a column address provided by the nine data lines on the CPU address bus. This input stage occurs with the clock signal at a high level thus providing address data to RAM 126 via terminals A of multiplexers 156, 160. In the second cycle, the clock signal is at a low level and terminals B of multiplexers 156, 160 are applied to the address terminals of RAM 126, thus providing an address produced by address generator 122 for reading data from RAM 126 which is thereafter provided to DAC 218 for display.

It can thus be seen that data defining monitor pixels is written into RAM 126 one row at a time and that data is read therefrom one column at a time in the NTSC standard video format.

The instant embodiment of the invention provides a method and apparatus for rapidly transferring data from a first memory in which it is accumulated and averaged into a second memory from which such data may be rapidly read in order to generate a video display. This advantage is attained as a result of selecting a block of memory in RAM 126 (rather than a single location) by latching a row number in latch 146 which is presented to a portion of the address bus on RAM 126. When such a row is being transferred, the remainder of the address bus in RAM 126 is tied to the CPU address bus. Thus, each pixel byte in the row being read from RAM 92 appears on data bus 78 responsive to a CPU-generated address which appears on address bus 88. The CPU-generated address thus maps each pixel byte into adjacent column locations in the memory block selected by the row address applied to address terminals $A_0-A_7$ of RAM 126. Pixel byte rows are therefor rapidly and efficiently transferred without the status and handshaking routines normally associated with input/output ports since such ports are not used. In addition, such transfer is accomplished without the necessity of generating a unique complete address for each pixel byte so transferred, thus further speeding the process.

The advantage attained by rapid transfer of data is significant since the speed at which data is transferred from the memory in which it is accumulated to a memory from which it is read for operation of a video signal defines an upper limit on the rate of logging and the rate at which recorded data may be played back.

As can be seen from examination of FIG. 7, the video memory circuit may be built using a relatively small number of commercially available chips which may be placed on a single circuit board. The transfer of data from RAM 92 to RAM 126 is thus accomplished in a rapid and efficient manner with apparatus which is relatively lightweight and low in cost.

It is to be appreciated that additions and modifications may be made to the embodiment disclosed herein without departing from the spirit of the invention when is defined in the following claims.

We claim:

1. Apparatus for creating video display signals from information generated by acoustically scanning a reflecting boundary circumferential of a borehole with a device having means for generating a first signal representative of the geographic orientation of a transducer acoustically scanning such a reflecting boundary and means for generating a series of digital second signals representative of acoustic reflections from the reflecting boundary, said apparatus for creating video display signals comprising:

means for generating an address associated with each first signal;

means for generating a series of different addresses with each address so generated being associated with a different second signal;

signal data storage means for storing each second signal in a location determined by the address associated therewith, thus forming a set of video precursor data;

video memory means for storing a plurality of sets of precursor data;

video memory selection means responsive to said address associated with each first signal for selecting a block of video memory locations in the video memory means, said block comprising a plurality of locations sufficient for storing a set of video precursor data; and means for transferring a set of video precursor data to a thus-selected block of the video memory means, each video memory location being selected jointly by said first signal address and by said second signal address.

2. The apparatus of claim 1 wherein said apparatus further includes means for reptitively performing the thus-specified functions and transferring a plurality of sets of video precursor data into said memory means.

3. The apparatus of claim 2 wherein said apparatus further comprises a video monitor for displaying resulting plurality of sets of video memory means as an image of the reflecting boundary.

4. The apparatus of claim 1 wherein each set of video precursor data comprises a series of second signals representative of a 360° borehole scan.

5. The apparatus of claim 4 wherein said apparatus is constructed and arranged so that said first signal occurs at a preselected geographic orientation for each 360° borehole scan and wherein each series of second signals occurring between said first signals is stored in locations selected by a series of second signal addresses which is repeated once after each first signal.

6. The apparatus of claim 5 wherein said video memory selection means further comprises means for selecting a video memory location by combining said first signal address and said second signal address.

7. The apparatus of claim 6 wherein said apparatus further includes means for addressing a plurality of video memory means locations for reading video precursor data therefrom.

8. The apparatus of claim 1 wherein said apparatus further includes means for addressing a plurality of video memory means locations for reading video precursor data therefrom.

9. The apparatus of claim 1 wherein said means for generating a first signal is operatively connected to said signal data storage means and wherein said signal data storage means includes means for generating a first signal address responsive to each first signal.

10. The apparatus of claim 9 wherein said apparatus further includes:
means for generating a digital marker signal responsive to the occurrence of such a first signal;
means for recording and playing back digital marker signals and digital second signals; and
means for causing said signal data storage means to respond to a played back digital marker signal in the manner of response to such a first signal.

11. The apparatus of claim 1 comprising:
means of applying addresses associated with second digital signals to each of signal data storage measn and video memory means.

12. The apparatus of claim 1 wherein:
signal data storage means comprises a summing buffer for summing data from a selected number of adjacent data values.

13. The apparatus of claim 12 comprising:
means for dividing thus summed data and for producing average data values representative of the selected numbers of adjacent data values.

14. The apparatus of claim 13 wherein:
the summing buffer is effective for summing adjacent data values in both vertical and horizontal dimensions in the summing buffer.

15. The apparatus of claim 1 wherein:
the signal data storage means and the video memory means are effective for storing peak data values and time data values for each 360° scan of the borehole and including means for displaying such stored peak data values and time data values in side-by-side video images of the reflecting boundary.

16. The apparatus of claim 1 wherein:
the signal data storage means and the video memory menas each comprise random access memory.

17. A method for creating video display signals from information generated by acoustically scanning a reflecting boundary circumferential of a borehole with a device which generates a first signal representative of the geographic orientation of a transducer acoustically scanning such a reflecting boundary and series of digital second signals representative of acoustic reflections from the reflecting boundary, said method for creating video display signals comprising the steps of:
generating an address associated with each first signal;
generating a series of different addresses with each address so generated being associated with a different second signal;
storing each second signal in a signal data storage means memory location determined by the address associated therewith, thus forming a set of video precursor data;
storing a plurality of sets of precursor data in the signal data storage means;
selecting a block of video memory locations in a video memory responsive to said address associated with each first signal, said block comprising a plurality of locations sufficient for storing a set of video precursor data; and
transferring a set of video precursor data to a thus selected block of the video memory each video memory location in the video memory being selected jointly by sadi first signal address and by said second signal address.

18. The method of claim 17 wherein said method further comprises the step of repetitively performing the thus specified steps and transferring a plurality of said sets of video precursor data into said video memory.

19. The method of claim 18 wherein said method further include the step of displaying a resulting plurality of sets of video precursor data transferred to the video memory on a video monitor as an image of the reflecting boundary.

20. The method of claim 19 comprising:
displaying peak data values and time data values in side-by-side images of the reflecting boundary.

21. The method of claim 17 wherein the step of generating a first signal representative of the geographic orientation of a transducer comprises the step of generating said first signal at a preselected geographic orientation for each 360° borehole scan and wherein the step of generating a series of addresses comprises the step of generating a series of addresses which is repeated once after each first signal.

22. The method of claim 21 wherein the step of selecting a block of video memory locations in the video memory comprises the steps of:
combining a first signal address and a second signal address; and
selecting a video memory location determined by said combined addresses.

23. The method of claim 22 wherein said method further includes the step of addressing a plurality of video memory locations for reading video precursor data therefrom.

24. The method of claim 17 wherein said method further includes the step of addressing a plurality of video memory locations for reading video precursor data therefrom.

25. The method of claim 17 comprising the steps of:
generating a digital marker signal responsive to the occurrence of such a first signal; and
recording digital marker signals and digital second signals.

26. The method of claim 17 comprising:
applying addresses associated with second signals to each of signal data storage means and video memory means.

27. The method of claim 26 comprising:
dividing thus summed data and producing an average data value representative of the selected number of adjacent data values.

28. The method of claim 17 further comprising:
summing data from a selected number of adjacent data values in a summing buffer in the signal data storage means.

29. The method of claim 28 wherein:
the summing buffer comprises a peak value summing buffer and a time value summing buffer.

30. The method of claim 28 comprising:
summing adjacent data values in both vertical and horizontal dimensions in the summing buffer.

31. The apparatus of claim 28 wherein:
the summing buffer comprises a peak value summing buffer and a time value summing buffer.

32. The method of claim 17 wherein:
the signal data storage means and the video memory each comprise rnadom access memory.

33. Apparatus for creating video display signals from information generated by acoustically scanning a reflecting boundary circumferential of a borehole with a device having means for generating a first signal representative of the geographic orientation of a transducer acoustically scanning such a reflecting boundary and means for generating a series of digital reflectance signals representative of acoustic reflections from the reflecting boundary, said apparatus comprising:

signal data storage means for storing such digital reflectance signals, said signal data storage means comprising:
a data bus;
an address bus;
means responsive to each digital reflectance signal for generating a column address and applying the same to said address bus for storing said digital reflectance signals in locations selected by said column addresses; and
means responsive to said first signal for generating a row address and applying the same to said data bus;
latch means for storing such a row address, said latch means being operatively connected to said data bus;
video memory means having an address port and a data port, said address port being operatively connected to said latch means and to said address bus and said data port being operatively connected to said data bus;
means for reading a series of digital reflectance signals from said signal data storage means by placing the same sequentially on said data bus responsive to sequential placement of column addresses on said address bus; and
means for writing each digital reflectance signal into said video memory means at a location related to such a row address stored in said latch means and to such a column address appearing on said address bus.

34. The apparatus of claim 33 wherein said apparatus further includes means for reading said digital reflectance signals from said video memory means by sequentially addressing said video memory means locations.

35. The apparatus of claim 33 wherein said apparatus further includes circuitry operatively connected to said video memory means for processing said digitial reflectance singals for video display on a video monitor.

36. The apparatus of claim 33 wherein said apparatus further includes:
means for generating a digital marker signal responsive to the occurrence of such a first signal;
means for recording and playing back digital marker signals and digital reflective signals; and
means for causing said signal data storage means to respond to a played back digital marker signal in the manner of response to such a first signal.

37. The apparatus of claim 33 wherein said apparatus further includes means for changing said row address stored in said latch means upon the occurrence of a fixed number of 360° scans made by said system.

38. The apparatus of claim 37 wherein said changing means is constructed to repeatedly generate a sequential count equal to the number of rows in said video display with each count being temporarily stored in said latch means.

39. A method for generating a video display of information generated by a system of the type which scans a borehole and thereby generates electrical pulses indicative of the condition of the formation surrounding the borehole, said method comprising:
scanning the borehole for one rotation;
generating digital reflectance signals representative of the electrical pulses generated during said rotation;
storing said digital reflectance signals in a first memory at locations identified by different first addresses, each such digital reflectance signal being stored at a different location;
generating a second address and providing the same to a second memory; and using said second address for selecting a block of video memory locations in the second memory sufficient for storing digital reflectance signals generated during said rotation stored in the first memory;
reading said digital reflectance signals from sadi first memory by addressing the same in sequence; and
writing each of said digital reflectance signals into said second memory at an address related to said first and second addresses.

40. The method claim 39 wherein said method further includes the steps of:
writing each of said digital reflectance signals into a third memory at an address related to said first and second addresses; and
alternating writing digital reflectance signals into said second and third memories.

41. The method of claim 39 wherein said method further includes the steps of:
scanning the borehole for a plurality of rotations; and
generating said second address upon each occurrence of a fixed number of rotations.
alternating writing digital reflectance signals into said second and third memories.

42. The method of claim 39 wherein said method further includes the step of alternating writing a digital reflectance signal into said second memory with reading a digital reflectance signal from said second memory.

43. The method of claim 39 wherein the step of writing each of said digital reflectance signals into said second memory comprises the step of writing each of said digital reflectance signals into said second memory at a digital address comprising the concatenation of said first and second addresses.

44. The method of claim 39 wherein said method further includes the step of reading said digital reflectance signals from said second memory by addressing the same in sequence.

45. The method of claim 44 wherein said method further includes the steps of providing said digital reflectance signals to circuitry for processing the same for video display on a video monitor.

* * * * *

UNITED STATES PATENT AND TRADEMARK OFFICE
CERTIFICATE OF CORRECTION

PATENT NO. : 4,774,573

DATED : September 27, 1988

INVENTOR(S) : Houston B. Mount II and Steven A. Morris

It is certified that error appears in the above—identified patent and that said Letters Patent is hereby corrected as shown below:

Column 6, line 1, "(FIG.46)" should read --(FIG. 4)--.

Column 9, line 32, "dara" should read --data--.

Column 14, line 8, "ff" should read --of--.

Column 18, line 3, "when" should read --which--.

Column 18, line 40, "reptitively" should read --repetitively--.

Column 18, line 43, after "displaying" insert --a--.

Column 18, line 44, after "video" and before "memory", insert --precursor data transferred to the video--.

Column 19, line 17, "measn" should read --means--.

Column 19, line 40, "menas" should read --means--.

UNITED STATES PATENT AND TRADEMARK OFFICE
CERTIFICATE OF CORRECTION

PATENT NO. : 4,774,573

DATED : September 27, 1988

INVENTOR(S) : Houston B. Mount II and Steven A. Morris

It is certified that error appears in the above-identified patent and that said Letters Patent is hereby corrected as shown below:

Column 20, line 1, "sadi" should read --said--.

Column 20, line 9, "include" should read --includes--.

Column 22, line 25, "sadi" should read --said--.

Column 22, lines 42 and 43, folowing Claim 41, delete "alternating writing digital reflectance signals into said second and third memories".

Signed and Sealed this

Seventh Day of March, 1989

*Attest:*

DONALD J. QUIGG

*Attesting Officer*    *Commissioner of Patents and Trademarks*